United States Patent
Gupta

(10) Patent No.: US 6,952,101 B2
(45) Date of Patent: Oct. 4, 2005

(54) METHOD FOR DETERMINING DIRECTION TO A TARGET FORMATION FROM A WELLBORE BY ANALYZING MULTI-COMPONENT ELECTROMAGNETIC INDUCTION SIGNALS

(75) Inventor: Pravin Gupta, Roorkee (IN)

(73) Assignee: KJT Enterprises, Inc., Houston, TX (US)

( * ) Notice: Subject to any disclaimer, the term of this patent is extended or adjusted under 35 U.S.C. 154(b) by 91 days.

(21) Appl. No.: 10/345,506

(22) Filed: Jan. 16, 2003

(65) Prior Publication Data

US 2004/0140091 A1 Jul. 22, 2004

(51) Int. Cl.[7] ............................................. G01V 3/12
(52) U.S. Cl. .................... 324/339; 166/254.1; 324/326; 324/327; 367/37
(58) Field of Search ........................... 166/254.1, 255.2, 166/65.1, 66; 324/326, 327, 339–343; 73/152.02, 152.54; 367/37, 38

(56) References Cited

U.S. PATENT DOCUMENTS

| | | | |
|---|---|---|---|
| 3,993,944 A | * | 11/1976 | Meador et al. ............. 324/341 |
| 4,849,699 A | * | 7/1989 | Gill et al. .................. 324/339 |
| 5,311,484 A | * | 5/1994 | Anderson et al. ............. 367/37 |
| 5,339,036 A | | 8/1994 | Clark et al. |
| 5,757,191 A | | 5/1998 | Gianzero |
| 5,781,436 A | | 7/1998 | Forgang et al. |
| 5,999,883 A | | 12/1999 | Gupta et al. |
| 6,819,111 B2 | * | 11/2004 | Fanini et al. ................. 175/45 |

* cited by examiner

*Primary Examiner*—William Neuder
*Assistant Examiner*—Matthew J. Smith
(74) *Attorney, Agent, or Firm*—Richard A. Fagin

(57) ABSTRACT

A method is disclosed for determining a direction of a target formation with respect to an instrument in a wellbore. The target has an electrical conductivity different than earth formations surrounding the wellbore. The method includes inducing time varying electromagnetic fields in the formations surrounding the wellbore. The electromagnetic fields have at least some components along mutually orthogonal directions. Voltages induced by the time varying electromagnetic fields are detected. The detecting is performed to have at least some component along mutually orthogonal directions. The direction of the target is calculated from the detected voltages.

7 Claims, 3 Drawing Sheets

FIG. 1A

METHOD FOR DETERMINING DIRECTION TO A TARGET FORMATION FROM A WELLBORE BY ANALYZING MULTI-COMPONENT ELECTROMAGNETIC INDUCTION SIGNALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of electromagnetic induction formation evaluation devices. More particularly, the invention relates to methods and systems for determining a direction to a target Earth formation from a downhole instrument disposed in a wellbore by using multiple directional component electromagnetic induction measurements.

2. Background Art

Electromagnetic induction formation evaluation devices known in the art include axisymmetric instruments. Axisymmetric instruments have one or more solenoid-type transmitter coils coupled to a source of alternating current or switched current, and one or more solenoid-type receiver coils disposed at axially spaced apart locations from the transmitter along the instrument. The receivers are coupled to various circuits in the instrument which detect amplitude and phase of voltages induced in the receivers. The amplitude and phase of the voltages are related in various ways to the electrical conductivity of the media (Earth formations) surrounding the instrument. One such instrument is described, for example, in U.S. Pat. No. 5,841,281 issued to Beard et al.

In axisymmetric instruments, the solenoid-type coils are wound so that their longitudinal axes (and consequently their magnetic dipole moments) are substantially parallel to the axis of the instrument, or more particularly, are substantially coaxial with the axis of the instrument housing. As a result, axisymmetric induction instruments have a response which is substantially uniform in any azimuthal direction around the longitudinal axis of the instrument. The transmitter and receiver solenoid coils may be positioned at particular axial spacings from each other, and may be electrically interconnected in such ways (e.g., in series in the same polarity and/or in series in opposed polarity) as to provide the instrument with selected lateral (radial) resolution and with selected axial resolution. Methods are well known in the art for determining a spatial distribution of various electrically conductive media with respect to the instrument, where the instrument includes at least a plurality of receivers. See, for example, U.S. Pat. No. 5,703,773 issued to Tabarovsky et al.

More recently, various types of multi-axial or multi-directional induction instruments have become known in the art. Multi-directional induction instruments include transmitters and receivers which have magnetic dipole moment oriented along directions other than parallel to the axis of the instrument. One example of such a multi-directional instrument is described in U.S. Pat. No. 5,781,436 issued to Forgang et al. The instrument disclosed in the Forgang et al. '436 patent includes transmitters and receivers oriented along three mutually orthogonal axes. The instrument disclosed in the '436 patent has as one objective determining horizontal and vertical components of conductivity of electrically anisotropic Earth formations. Such electrical conductivity components are more generally known as components of electrical conductivity in a direction parallel to the attitude (bedding plane orientation) of the Earth formations, and in a direction perpendicular to the bedding plane orientation of the Earth formations. Determining the parallel and perpendicular conductivity components is performed in general by interpreting measurements of induced voltages made along mutually orthogonal axes, resulting from electromagnetic fields induced along mutually orthogonal axes. One method for determining conductivity in parallel and perpendicular directions in anisotropic Earth formations is described, for example, in U.S. Pat. No. 5,999,883 issued to Gupta et al.

Another example of a multi-directional electromagnetic induction instrument is disclosed in U.S. Pat. No. 5,757,191 issued to Gianzero. The instrument disclosed in the '191 patent is adapted to electronically "rotate" induction signals detected by the receivers on the instrument to recreate the response that would obtain if the instrument were disposed in earth formations having bedding orientation substantially perpendicular to the axis of the instrument. As is well known in the art, having bedding orientation substantially perpendicular to the axis of the instrument is a substantially ideal condition for induction logging using conventional axisymmetric induction well logging instruments because the formations disposed around the instrument would in such orientation tend to have conductivity that is symmetrically distributed around the longitudinal axis of the instrument.

It is often the case, however, that Earth formations are not symmetrically distributed around a wellbore. As described in the '191 patent in particular, and also in the '883 patent referred to above, it is frequently the case that the bedding orientation of the earth formations is not perpendicular to the instrument axis. Bedding orientation other than perpendicular to the instrument axis results from various combinations of formation "dip" (inclination from horizontal of the bedding orientation) and wellbore inclination (deviation of the wellbore from vertical).

It is often the case that the Earth formations are not arranged in substantially planar, parallel arrangements of various layers of the formations as is commonly simulated or modeled in order to interpret response of common well logging instruments. In some cases, an Earth formation of interest may consist of an isolated (laterally and/or vertically limited) segment of rock which has a different electrical conductivity than the surrounding Earth formations. Some of these isolated formations of interest may be petroleum bearing reservoirs or other formations of economic interest as they can be used as marker formations in directional drilling. In order to more efficiently be able to penetrate such isolated, or "target", formations of interest, it is desirable to have a wellbore instrument that can estimate a direction to the target formation from any position within a wellbore.

SUMMARY OF THE INVENTION

One aspect of the invention is a method is for determining a direction of a target formation with respect to an instrument in a wellbore. The target has an electrical conductivity different than earth formations surrounding the wellbore. The method includes inducing time varying electromagnetic fields in the formations surrounding the wellbore. The electromagnetic fields have at least some components along mutually orthogonal directions. Voltages induced by the time varying electromagnetic fields are detected. The detecting is performed to have at least some component along mutually orthogonal directions. The direction of the target is calculated from the detected voltages.

In one embodiment, the electromagnetic fields are substantially continuous. In another embodiment, the time varying electromagnetic fields are transient. In one embodiment, an orientation of the instrument is measured with respect to a geographic reference and the direction is then determined with respect to the geographic reference. A further embodiment includes the constraints of directionality using other geophysical directionally sensitive measurements such as seismic or directional density measurements.

Other aspects and advantages of the invention will be apparent from the following description and the appended claims.

DETAILED DESCRIPTION

The description which follows includes various embodiments of a "well logging" instrument for making measurements used in various aspects of a method according to the invention. Well logging connotes making a substantially continuous set of measurements as the measuring instrument is moved along a wellbore. However, for purposes of defining the scope of the invention, it should be clearly understood that individual measurements made at a single position along a wellbore may also be used in accordance with the invention. Accordingly, the invention is not limited in scope to well logging techniques or well logging instruments within the connotation of the term "well logging."

Figures 1, 1A:
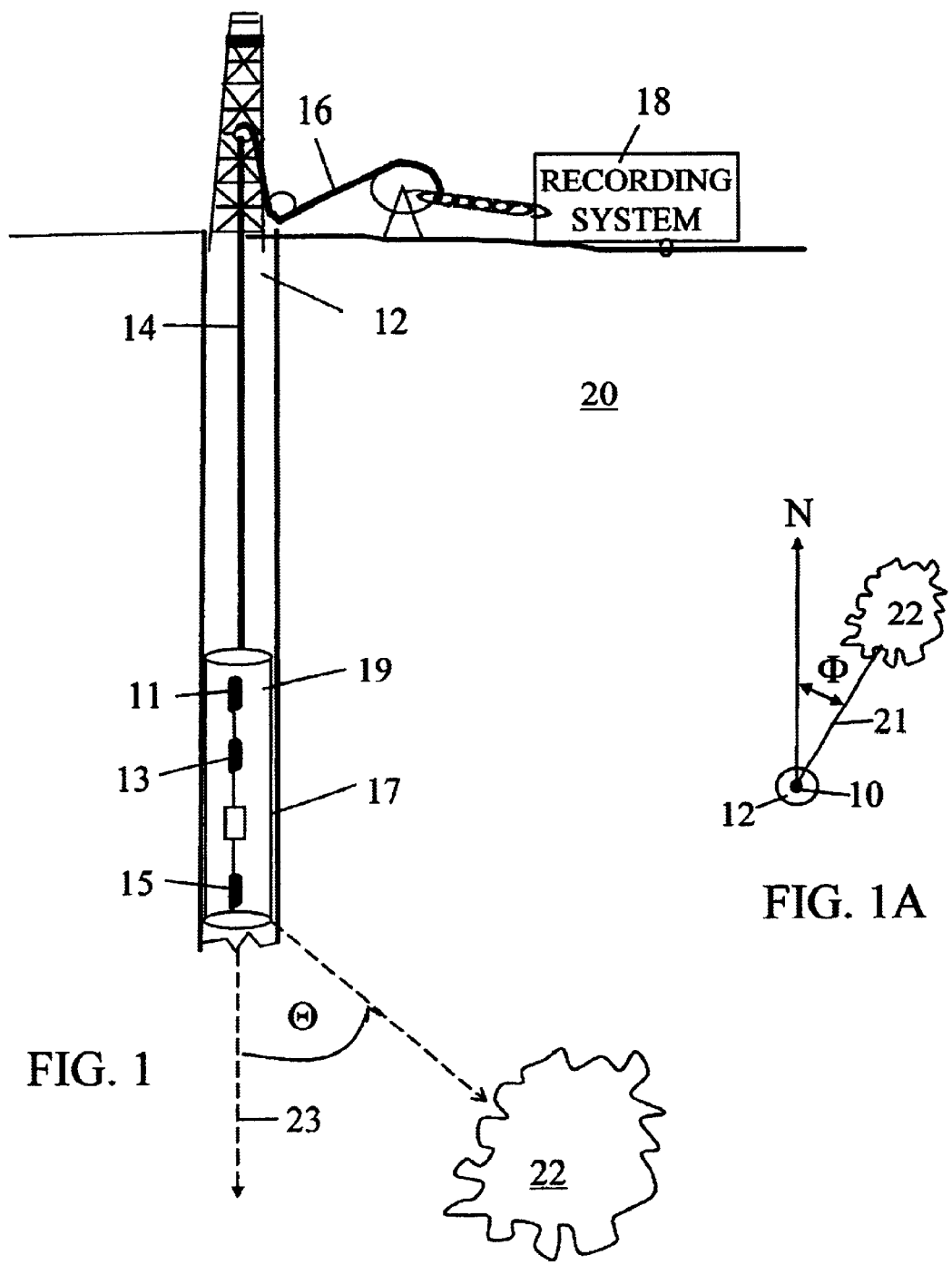
FIG. 1 shows a multi-directional electromagnetic well logging instrument disposed in a wellbore drilled through Earth formations.
FIG. 1A shows one component of a direction from the logging instrument to a target formation.

A multi-component (multi-directional) well logging instrument is shown generally at 10 in FIG. 1. The instrument 10 is shown disposed at one end of an armored electrical cable 14. The cable 14 is used to move the instrument 10 along a wellbore 12 drilled through earth formations 20. The cable 14 conducts electrical power from a surface recording system 18 to the instrument 10, and returns signals generated by the instrument 10 to the recording system 18 for decoding, recording and interpretation. The cable 14 is extended and retracted to move the instrument 10 by means of a winch 16 or similar conveyance well known in the art.

The foregoing description of the well logging instrument 10 as being conveyed at the end of the armored electrical cable 14 is only one example of conveyance of a well logging instrument according to the invention. Another means of conveyance that may be used in other embodiments is an instrument adapted to be coupled to a drilling tool assembly or drill string. The instrument is moved as the drill string is moved into and out of the wellbore. Such conveyance is known in the art as logging while drilling ("LWD"). Furthermore, conducting electrical power along the cable, and returning measurement signals to the recording system along the cable is not intended to limit the scope of the invention. LWD systems known in the art include various sources of electrical power within the LWD instrument, and include systems for either or both recording measurements in the instrument for later retrieval, and communicating some of the signals to the earth's surface such as by mud (drilling fluid) pressure modulation telemetry or electromagnetic telemetry. See, for example, U.S. Pat. No. 5,339,036 issued to Clark et al. Accordingly, cable conveyance, power and signal transmission as shown generally in FIG. 1 are not intended to limit the scope of the invention.

The instrument 10 includes an elongated housing 19 adapted to traverse the wellbore 12. The housing 19 includes, within the interior thereof or on its exterior surface, one or more electromagnetic transmitter antenna arrays, shown generally at 15, and one or more electromagnetic receiver antenna arrays, shown generally at 11 and 13. Axial spacing between the transmitter array 15 and the one or more receiver arrays 11, 13 is selected to provide the instrument 10 with selected lateral (radial) and vertical (axial) response characteristics, as is well known in the art. In embodiments of the invention, the transmitter 15 and receiver 11, 13 arrays preferably include antennas arranged to have magnetic dipole moment along mutually orthogonal directions. Examples of suitable antenna structures will be explained below with reference to FIG. 2.

The instrument 10 also includes controller and signal processing circuits, (collectively "circuits") shown generally at 17, which may be of any type well known in the art for generating suitable power to energize the transmitter 15, and for detecting selected components of voltages induced in the receivers 11, 13 in order to determine particular electrical characteristics of the earth formations 20. The circuits 17 may include a telemetry transceiver (not shown separately) for communicating all or part of such measurements along the cable 14 to the recording system 18. The circuits 17 may in other embodiments include a local recording device (not shown separately) for locally storing some or all of the signals detected by the receivers 11, 13.

The example earth formations shown in FIG. 1 include a so-called "target" formation 22 which may be a petroleum-bearing reservoir or other formation of interest. In the invention, the target formation 22 only need have an electrical conductivity which is electromagnetically distinguishable from the conductivity of the earth formations 20 surrounding the wellbore 12.

A direction from the position of the instrument 10 to the target formation 22, preferably referenced to the position of the transmitter 15, can be defined by an inclination angle and an azimuth or direction angle. The inclination angle, $\theta$, is subtended between the axis 23 of the wellbore 12 and a line 21 between the center of the target 22 and the transmitter 15. As shown in FIG. 1A the azimuth angle $\phi$ is subtended between the line 21 and a reference direction in a plane perpendicular to the axis of the wellbore 12. One suitable reference is magnetic north, or geographic north, indicated by N in FIG. 1A. In embodiments of the invention, the circuits (17 in FIG. 1) may also include directional sensors (not shown separately), such as triaxial magnetometers and triaxial accelerometers, which enable determining the orientation of the instrument 10 with respect to a geographic reference such as true (geographic) north, or magnetic north, and earth's gravity (vertical). Triaxial accelerometers, triaxial magnetometers and associated circuits for determining orientation of a well logging instrument are well known in the art. See, for example, U.S. Pat. No. 5,739,431 issue to Petrie and U.S. Pat. No. 5,287,925 issued to Ives. The actual type of sensors used to determine orientation of the instrument 10 with respect to gravity and the geographic reference are not intended to limit the scope of the invention.

Figure 2:
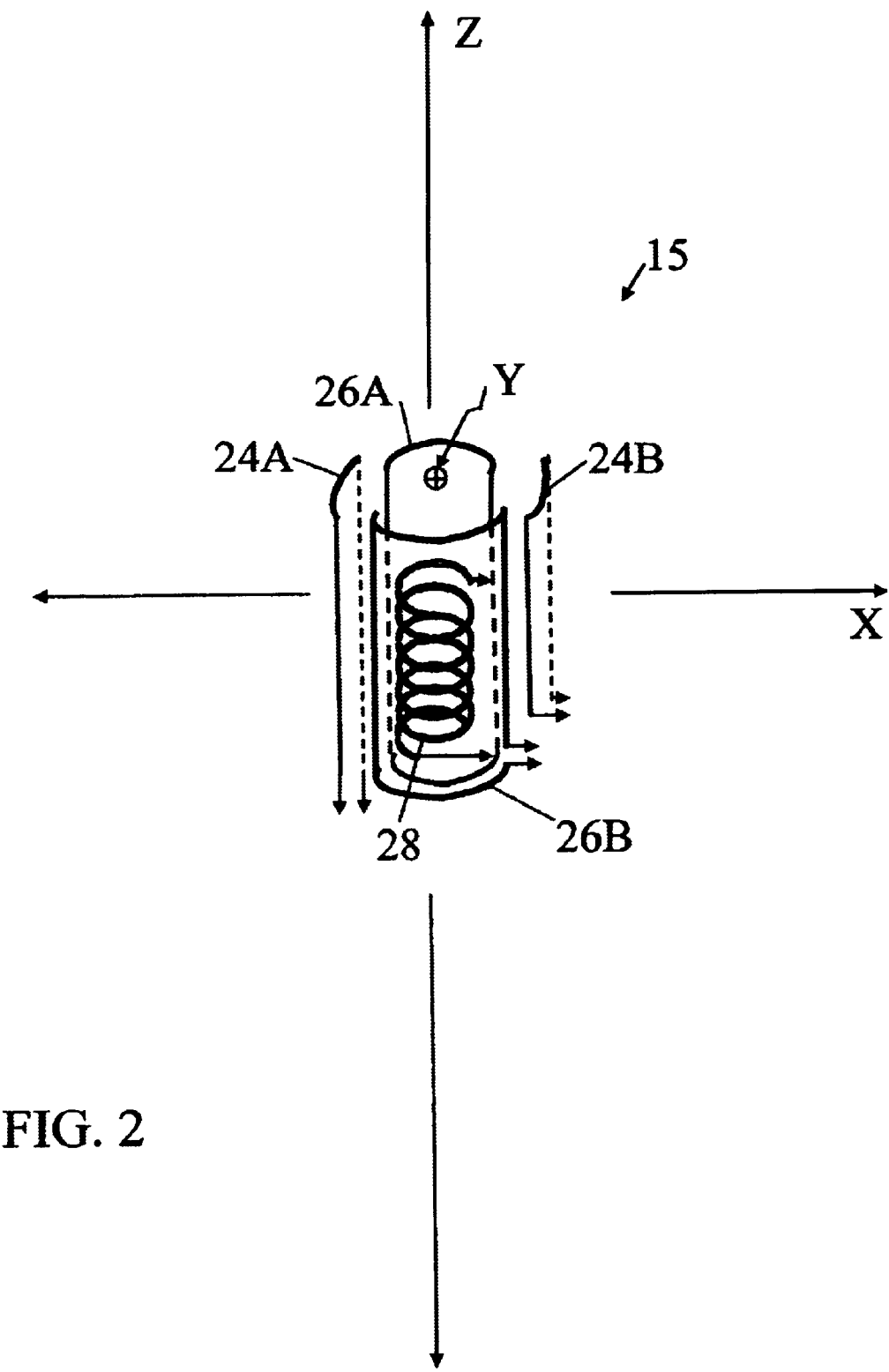
FIG. 2 shows one type of multi-directional antenna array that may be used in some embodiments of an instrument according to the invention.

One type of antenna array which is suitable for use in embodiments of an instrument according to the invention is shown in more detail in FIG. 2. The antenna array 15 in this example may be the transmitter of the instrument of FIG. 1. The array 15 includes a solenoid coil 28 wound so that its magnetic moment is substantially coaxial with or parallel to the axis of the instrument. Conventionally, this axis is referred to as the z axis, as is indicated in FIG. 2. A first opposing pair of saddle coils 24A, 24B is shown disposed on the sides of the solenoid coil 28. Such saddle coils are disclosed, for example, in U.S. Pat. No. 5,757,191 issued to Gianzero. The orientation of the first pair of saddle coils 24A, 24B results in an antenna having a magnetic moment oriented substantially perpendicular to the z axis, this orientation being shown as along an x axis. A second pair of saddle coils is shown at 26A and 26B and is oriented so that the magnetic moment of the second pair of saddle coils 26A, 26B is perpendicular to both the x axis and the z axis, this orientation being referred to as along a y axis. The array shown in FIG. 2 may also be used for any one or all of the receivers (11, 13 in FIG. 1). Individually, each antenna in the array 15 having a dipole moment oriented along one axis, such as the solenoid coil, 28 and the saddle coil pairs 24A, 24B, and 26A, 26B, may be referred to as a "component" of the antenna array.

The embodiment of antenna array shown in FIG. 2 is only one example of antenna array according to the invention. An advantage of the array 15 shown in FIG. 2 is that the centers of each component of the array are all collocated. It should be clearly understood, however, that other types of antenna arrangements will also work according to the invention. For example, three mutually orthogonal solenoid coils could also be used. See, for example, U.S. Pat. No. 5,781,436 issued to Forgang et al. for an example arrangement of orthogonal solenoid coils. It should also be understood that arrangements of the antennas which are not mutually orthogonal may be used in other embodiments. Mutually orthogonal arrangements of antennas provide the advantages of maximum resolution of various directional components of induced voltages, and simplified calculations to be performed on the voltage measurements made by the receivers (11, 13 in FIG. 1), however, orthogonal arrangements are not intended to strictly limit the scope of the invention. Rather, it is only necessary that the antennas be arranged such that at least some component of the dipole moment of the antennas be along the three orthogonal axes. For example, antennas arranged so that their magnetic dipoles are at oblique angles to each other will perform according to the invention as long as at least some component of the dipole moment of the antennas is along the three mutually orthogonal axes.

Preferably, the circuits (17 in FIG. 1) are adapted to actuate each component of the transmitter (15 in FIG. 1) individually, for example, alternating or switched current may be applied successively to the solenoid coil 28, the first saddle coil pair 24A, 24B, and the second saddle coil pair 26A, 26B. Actuating the transmitter component antennas with alternating or switched current induces electromagnetic fields in the earth formations (20 in FIG. 1) surrounding the instrument. These alternating electromagnetic fields themselves induce eddy currents in the formations, the magnitude of which is related to the conductivity of the formations. The eddy currents in turn induce voltages in the various receiver component antennas. During or after each transmitter antenna component actuation, voltages induced in each component of each receiver (11, 13 in FIG. 1) are detected by the circuits (17 in FIG. 1) for interpretation.

Some embodiments of an instrument according to the invention actuate each transmitter component using so-called frequency domain or continuous wave excitation. In such embodiments, a substantially sinusoidal alternating current having at least one, and in some cases several superimposed frequencies, is applied to each transmitter component antenna. Circuitry which may be used in such embodiments in the circuits (17 in FIG. 1) is described in U.S. Pat. No. 5,585,727 issued to Fanini et al. Parts of the circuits 17 adapted to detect particular signal components in the voltages induced in the receiver antennas is may also be similar to those disclosed in the '727 patent. Typically, in frequency domain (continuous wave) induction logging, amplitudes of a component of the induced voltages which is in phase with the transmitter current, and a component which is in quadrature with the transmitter current are measured. These measurements are used to estimate electrical conductivity in a radially and axially defined region related to the spacing between the transmitter and receiver antennas.

Other embodiments of an induction logging instrument according to the invention may use so-called transient electromagnetic measurements to estimate conductivity of the formations surrounding the instrument. Suitable circuits and methods for performing transient electromagnetic induction measurements are disclosed, for example in U.S. Pat. No. 5,955,884 issued to Payton et al. Suitable electronic circuitry which may be included in the circuits 17 in embodiments of the instrument which make transient measurements include a high performance induction transmitter switch as disclosed in U.S. Pat. No. 5,646,561 issued to Forgang et al. Transient electromagnetic induction measurements may provide the instrument with more sensitivity at large lateral (radial) distances from the axis of the instrument, and therefore may provide indication of the direction of the target formation (22 in FIG. 1) from greater distances than embodiments of the instrument which make frequency domain measurements.

Irrespective of the type of measurement made, inducing time varying electromagnetic fields in the formations, as is known in the art, results in the eddy currents flowing in so-called "ground loops" that are substantially perpendicular to the magnetic moment of the particular transmitter component antenna which induced them. Electromagnetic fields generated by the eddy currents are themselves substantially perpendicular to the ground loops. As a result of the arrangement of transmitter and receiver component antennas, the instrument (10 in FIG. 1) has response which is principally sensitive to conductivity distribution about three mutually orthogonal directions.

The induced voltages detected by each component antenna in any one or more of the receiver arrays (11, 13 in FIG. 1) will be represented herein as a matter of convenience with respect to the transmitter component which was actuated to cause the particular induced voltage, and the receiver component for which the detection is being analyzed. For example, $V_{xx}$ represents the voltage detected by the x component receiver antenna for actuation of the x component transmitter antenna. $V_{xz}$, correspondingly, represents the voltage induced by the x transmitter component antenna as detected by the z component receiver antenna. The azimuthal orientation of the instrument (10 in FIG. 1) is referenced to direction of the dipole moment of the x component antenna. Therefore, measurements made by the circuits (17 in FIG. 1) of the azimuthal orientation of the instrument correspond to an angle subtended between the x axis and the geographic reference. It should be clearly understood that referencing the instrument orientation to the x axis is a matter of convenience and is not intended to limit the scope of the invention. The instrument orientation could as easily be referenced to any other selected direction.

Because the target formation (22 in FIG. 1) has a conductivity which is different from the conductivity of the surrounding earth formations (20 in FIG. 1), the detected component voltages will be at least partially dependent on the instrument orientation with respect to the target formation 22. The response can be explained as follows.

First, the angle $\phi$ may be determined by the following expression:

$$\tan(2\phi) = (Vxy + Vyx)/(Vxx - Vyy)$$

In the above expression for $\phi$, the angle is referenced with respect to the x axis. The orientation of the x axis with respect to the fixed geographic reference, that is, geographic or magnetic north, may be determined using measurements from the directional sensors (not shown separately in the Figures) and by methods well known in the art, as previously explained.

After the angle $\phi$ is determined, the component voltages may be trigonometrically rotated through an angle $-\phi$ such that the voltages are referenced to the orientation of the x axis. Such rotated voltages may be referred to as Vxx', Vxy', etc. Rotation as used herein means calculating a voltage components that would obtain if the x component transmitter and receiver antennas were oriented along the line (21 in FIG. 1), or equivalent to the case in which angle $\phi$ is equal to zero. One example of rotation is disclosed in U.S. Pat. No. 5,999,883 issued to Gupta et al.

After rotation, the inclination angle $\theta$ may be determined by the following expression using the rotated voltages:

$$\tan(2\theta) = (Vzx' + Vxz')/(Vxx' - Vzz')$$

The angles $\phi$ and $\theta$ provide the direction of the target (22 in FIG. 1) with respect to the instrument, and consequently, to the geographic reference.

Both the angles $\phi$ and $\theta$ may have multiple solutions in the ranges 0 to 360 degrees and 0 to 180 degrees, respectively. In some embodiments, ambiguity in the solution for the angles $\phi$ and $\theta$ may be reduced by constraining the solution to a range having only one possible value of each angle $\phi$ and $\theta$. In some embodiments, values of the angles $\phi$ and $\theta$ may initially (or after the fact) be constrained by using another geophysical measurement. For example, the azimuthal orientation of the target formation may be estimated using surface seismic or inter-wellbore seismic measurements. As another example, directionally sensitive formation density measurements may be used to constrain the value of the angles $\phi$ and $\theta$.

Figure 3:
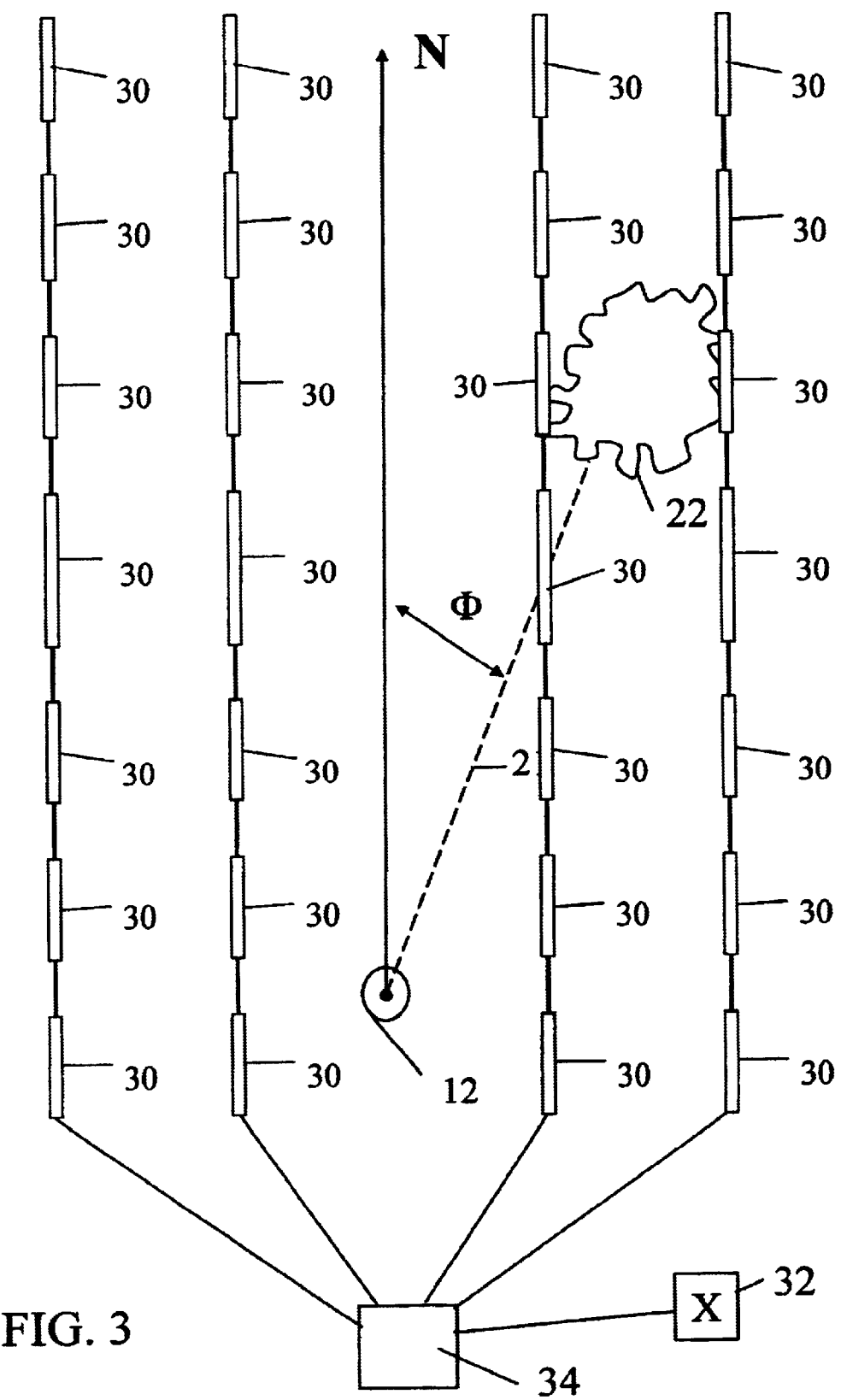
FIG. 3 shows an example of using a geophysical measurement to constrain solutions to direction angles determined from the multi-directional induction signals.

One embodiment of using a geophysical measurement to constrain the solution for the angles $\phi$ and $\theta$ is shown schematically in FIG. 3. The embodiment of FIG. 3 includes an array of seismic sensors, each shown at 30, disposed at the Earth's surface in a selected pattern. The sensors 30 are coupled to a recording system 34, which makes a time-indexed recording of the signals generated by the sensors 30. The recording system 34 includes a source controller (not shown separately) to actuate a seismic energy source 32. The source 32 may be explosive, vibrator, or any other source known in the art for seismic surveying. As is known in the art, seismic energy detected by the sensors 30 includes some which has been reflected from subsurface structures, including in the example of FIG. 3, the target formation 22. Using seismic signal processing techniques well known in the art, the geographic position of the target formation 22 may be estimated. The estimate of the target 22 position may be used to constrain the solution for the angle $\phi$ by comparing the target position and the wellbore 12 position. Angle $\phi$ may be defined as the angle subtended between the line 21 and geographic reference (north) as in the previous description. Similar techniques may be used to constrain the angle $\theta$.

By determining a direction to the target formation, in some applications changes in the planned trajectory of the wellbore may be made so as to increase the efficiency with which the wellbore approaches the target.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a direction of a target formation with respect to an instrument in a wellbore, the target having an electrical conductivity different than earth formations surrounding the wellbore, the method comprising:

inducing time varying electromagnetic fields in the formations surrounding the wellbore, the electromagnetic fields having at least some components along mutually orthogonal directions;

detecting voltages induced by the time varying electromagnetic fields; the detecting performed to have at least some components along mutually orthogonal directions; and calculating the direction of the target from the detected voltages, the direction determined as orientation of a line between a reference point on the instrument and a reference point on the target.

2. The method as defined in claim 1 wherein the calculating comprises determining an azimuthal direction of the target from signal components perpendicular to a longitudinal axis of the instrument, and determining an inclination from signal components parallel to the longitudinal axis.

3. The method of claim 1 wherein the time varying electromagnetic fields are substantially continuous.

4. The method of claim 1 wherein the time varying electromagnetic fields are transient.

5. The method of claim 1 further comprising measuring an orientation of the instrument with respect to a geographic reference, and determining the direction with respect to the geographic reference.

6. The method of claim 1 further comprising constraining the direction by making an estimate of the direction from a geophysical measurement.

7. The method of claim 6 wherein the geophysical measurement comprises surface seismic.

* * * * *